UNITED STATES PATENT OFFICE.

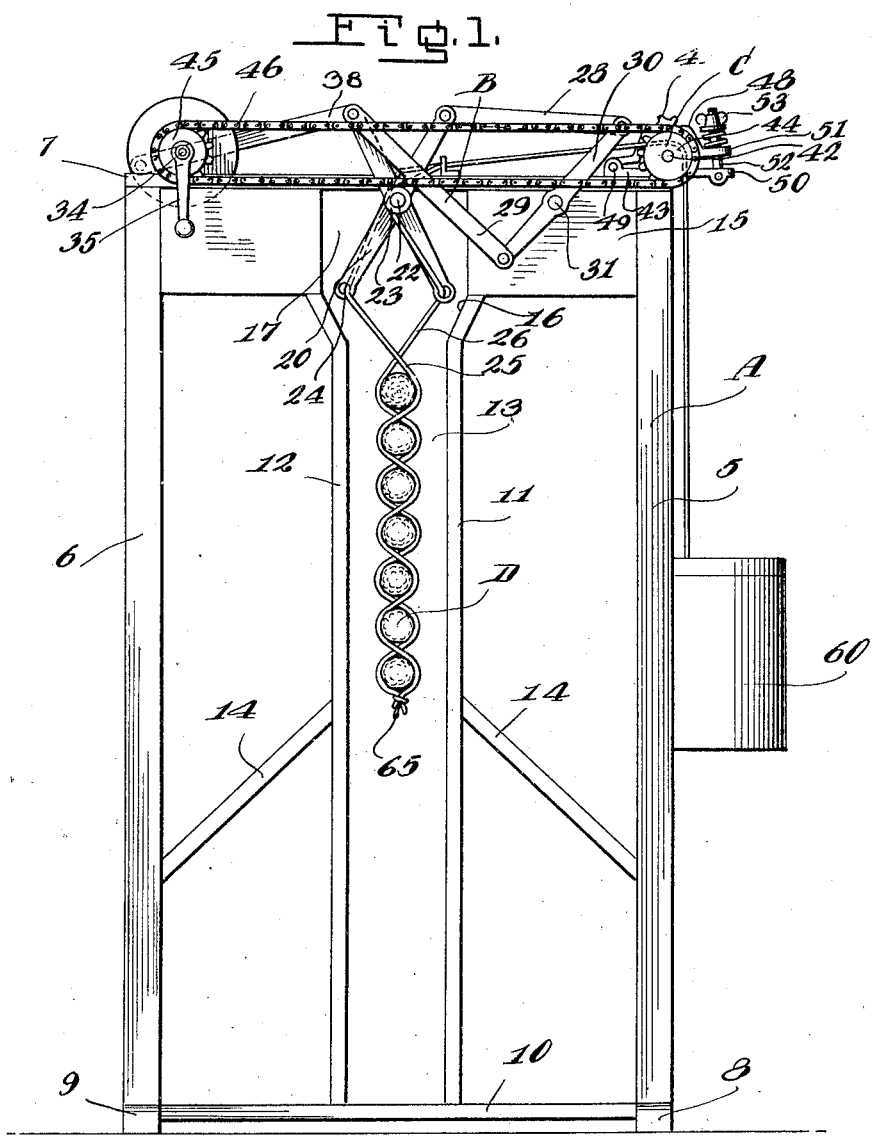

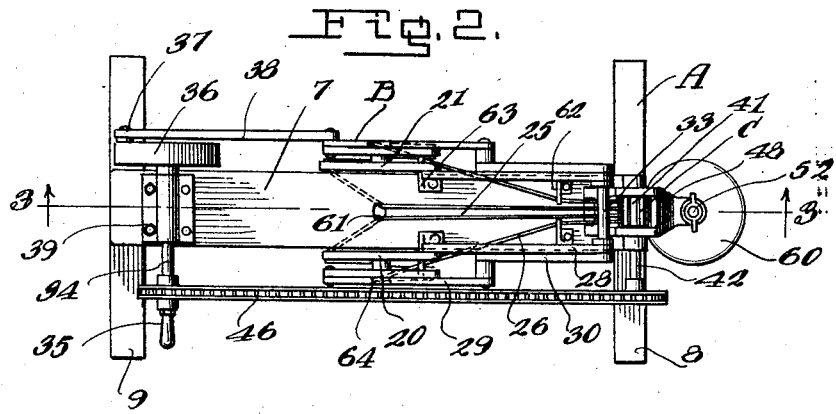
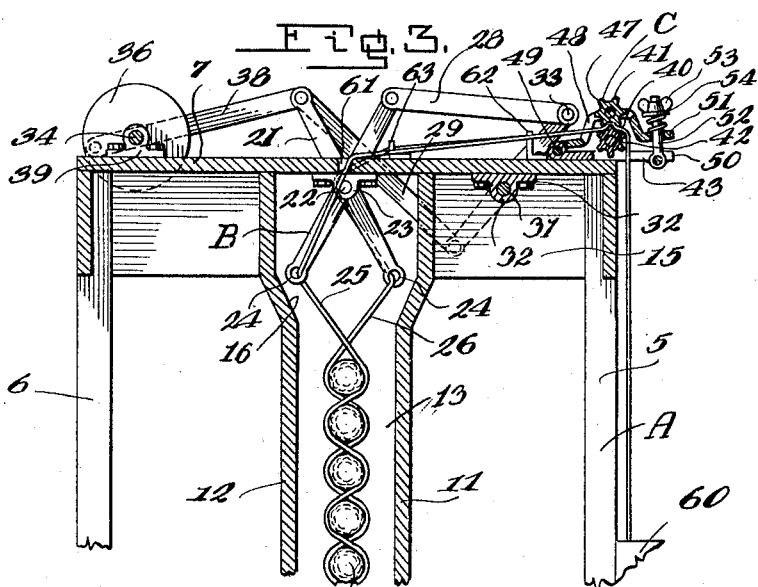
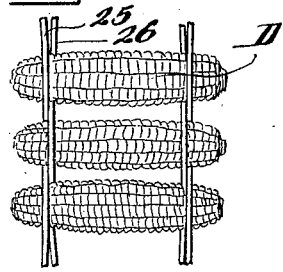

HARRY J. HEADRICK AND SAMUEL A. PALMER, OF MILLER, SOUTH DAKOTA.

MACHINE FOR PREPARING SEED-CORN FOR DRYING.

1,389,506.          Specification of Letters Patent.      Patented Aug. 30, 1921.

Application filed April 19, 1921. Serial No. 462,771.

*To all whom it may concern:*

Be it known that we, HARRY J. HEADRICK and SAMUEL A. PALMER, citizens of the United States, residing at Miller, in the county of Hand and State of South Dakota, have invented certain new and useful Improvements in Machines for Preparing Seed-Corn for Drying, of which the following is a specification.

This invention relates to a novel device for binding seed corn together to permit the convenient hanging thereof for drying, and the primary object of the invention is to provide an improved machine which will quickly and conveniently bind the seed corn together in superposed spaced relation in such a manner that the same can be conveniently hung from rafters of a barn or the like, and thus entirely eliminate the necessity of using the cumbersome and expensive seed corn racks now in vogue.

A further object of the invention is to provide a machine for preparing seed corn for drying embodying a frame, pairs of crossed arms, and means for synchronously operating the crossed arms and the twine feeding mechanism, the crossed arms being adapted to weave the binding twine back and forth around the ears of corn as the same are placed in the machine.

A further object of the invention is to provide in a machine for preparing corn for drying a novel means for feeding the binding twine, so as to prevent the accidental or too fast feeding of the corn, and a novel means for connecting the twine feeding mechanism with the twine crossing or binding mechanism.

A still further object of the invention is to provide an improved machine for binding corn together for drying of the above character, which is durable and efficient in use, one that is simple and easy to manufacture, and one which can be placed upon the market at a reasonable cost.

With these and other objects in view, the invention consists in the novel construction, arrangement and formation of parts, as will be hereinafter more specifically described, claimed and illustrated in the accompanying drawings, forming a part of this specification, in which drawings:

Figure 1 is a side elevation of the improved machine.

Fig. 2 is a top plan view of the same.

Fig. 3 is a fragmentary vertical longitudinal section through the same taken on the line 3—3 of Fig. 2.

Fig. 4 is a fragmentary view of a series of ears of corn bound together by the improved machine.

Referring to the drawings in detail, wherein similar reference characters designate corresponding parts throughout the several views, the letter A indicates the frame of the machine; B, the binding mechanism; and C, the twine feeding mechanism.

The frame A includes the pairs of spaced vertically disposed posts 5 and 6, which are connected together at their upper ends by a top board 7. Each pair of the supporting posts 5 and 6 at their lower ends are connected by transversely extending feet 8 and 9, which may be connected together by a suitable brace member 10. Arranged intermediate the spaced legs or posts 5 and 6 are the spaced guide plates 11 and 12, which define therebetween the guide way 13 for the corn to be bound together. As shown these guide plates 11 and 12 extend downwardly from the top board 7 to the bottom plate or reinforcing bar 10. The guide plates 11 and 12 are further braced by diagonal brace bars 14. The upper ends thereof are connected by guide pieces 15 with the pairs of posts 5 and 6 and with the top board 7. As shown the upper ends of the guide plates 11 and 12 are offset as at 16, so as to form enlarged portions in the guide for a purpose which will be hereinafter more fully described.

The operating means B for binding the ears of corn together comprises a pair of crossed levers 20 and a pair of crossed levers 21. These levers are arranged with their pivot points in alinement with each other and in alinement with the transverse center of the top board 7. Each pair of the levers 20 and 21 are mounted at their points of crossing upon suitable pivot pins 22, which are carried by bearings 23. These bearings 23 are secured in any preferred manner to the lower surface of the top board 7. The lower ends of each pair of the levers 20 and 21 are provided with eyes 24 through which are adapted to be threaded the binding cords or twine 25 and 26. It can be seen that four strands of the twine are utilized, one strand for each blade of the pairs of cross levers.

The blades of the pairs of levers are adapted to work back and forth similar to the blades of a pair of scissors, and it can be seen that each time the pairs of levers are operated, the binding cords will be crossed.

The upper ends of the blades of each pair of levers are operatively connected by means of links 28 and 29, with the opposite ends of a pair of two armed levers 30. These levers 30 are mounted intermediate their ends upon a suitable shaft 31, which is carried by bearings 32 secured to the lower surface of the top board 7. The upper ends of the two armed levers 30 are operatively connected together by means of a cross arm 33. By this construction, it can be seen that the blades of the pairs of levers can be operated synchronously, and that each pair of levers will also be operated synchronously.

In order to permit of the convenient operation of these pairs of crossed levers 20 and 21, an operating shaft 34 is provided. This operating shaft 34 is driven in any preferred manner, but as shown a crank 35 is provided. The opposite end of the shaft 34 from the crank 35 is provided with a suitable balance wheel 36, which has connected thereto an eccentric wrist pin 37. This wrist pin has suitably connected thereto a connecting rod 38, which is in turn connected to the upper end of one of the blades of one of the pairs of the crossed levers 20 and 21.

The shaft 34 is mounted in suitable bearings 39 carried by the upper surface of the top piece 7 adjacent to one end thereof. It can be seen that by turning the crank 35, the pairs of levers will be synchronously operated. In order to permit the correct feeding of the pairs of the cords 25 and 26 to each pair 20 and 21 of the crossed levers, the mechanism C is provided. This mechanism C is operatively connected to the shaft 34, as will be hereinafter described. The binding cord or twine feeding mechanism C comprises a pair of superposed relatively wide intermeshing gear wheels 40 and 41. The lower gear wheel 40 is mounted upon a suitable shaft 42, which is rotatably mounted in bearings carried by a lower plate 43 which is secured in any preferred manner to the upper surface of the top board 7 adjacent to the end thereof which is remote from the bearing 39. This shaft 42 has keyed or otherwise secured thereto a suitable sprocket wheel 44, which is in direct alinement with a sprocket wheel 45, which is keyed on the shaft 34. A suitable sprocket chain 46 is trained around the sprocket wheels 44 and 45. The upper gear wheel 41 is mounted upon a suitable shaft 47, which is carried by a suitable casting 48. This casting 48 has its inner end pivotally connected to the plate 43, by means of a pivot pin 49. The plate 43 and the casting 48 are provided with ears 50 and 51 and the ear 50 carries a pivoted bolt 52, which extends through the ear 51. This pivoted bolt 52 has mounted thereon a suitable thumb nut 53 which bears against an expansion spring 54. It can be seen that the expansion spring normally tends to urge the gear wheel 41 into engagement with the gear wheel 40 and by tightening or loosening the thumb nut 53, the tension of the spring can be adjusted.

One end of the frame A below the gear wheels 40 and 41 is provided with a suitable receptacle 60 for the pairs or strands of twine 25 and 26.

In operation of the improved machine, the strands 25 of the twine are fed between the gear wheels 40 and 41 and through a central opening 61 and then through the eyes of the corresponding lever of each pair. The strands 26 are then fed between the gear wheels 40 and 41 and through suitable guides 62 arranged adjacent to the gear wheels, and then through suitable guides 63 arranged adjacent to the transverse center of the top board 7, at the longitudinal edges thereof and then around suitable pulleys 64 and through the eyes 24 of the other corresponding levers of the pairs of levers 20 and 21. The ends of the pairs of twine which extend through the eyes in the pairs of levers are tied together as at 65 and an ear of corn is then laid between the strands of twine. The crank handle 35 is then turned, which will synchronously operate the pairs of levers 20 and 21, which will cross the strands of twine and operate the gear wheels 40 and 41, which will feed a desired amount of cord through the guides for permitting another ear of corn to be placed between the strands of twine. This operation is continued until the desired number of ears of corn are bound together. When the desired number of ears of corn are in place the operator turns the crank one half a turn to loosen the twine and to position the blades of the pairs of levers at the central portion of the machine. The twine is then cut and the corn is taken from the machine.

The provision of the gears 40 and 41 absolutely precludes the too fast feeding of the twine and prevents the slipping of the twine from the receptacle 60.

From the foregoing description, it can be seen that an exceptionally simple and durable machine has been provided for binding a number of ears of corn together to permit the same to be suspended or hung from the rafters of a barn or the like, to permit the same to be readily dried.

Changes in details may be readily made without departing from the spirit or scope of this invention; but,

We claim:

1. A machine for binding seed corn together for drying comprising a frame including a pair of oppositely disposed legs, feet connecting the lower terminals of the legs together, a longitudinally extending top board carried by the legs, a centrally positioned vertically disposed guide carried by the frame, a pair of cross levers pivotally secured to each opposite side of the top board, a cross shaft, rotatably carried by the top board, a pair of spaced levers secured intermediate their ends to the cross shaft, means operatively connecting the opposite ends of the levers to the upper ends of the pairs of cross levers, an operating shaft, means for operating the shaft, means operatively connecting the shaft with the cross levers, the pairs of cross levers being disposed in said guide adjacent to the upper end thereof.

2. A machine for binding corn together for drying comprising a frame, pairs of crossed levers pivotally carried by the frame, each lever of the pairs of levers having a strand of twine associated therewith, means for feeding the twine to the levers, and means for synchronously operating the pairs of levers and the twine feeding means.

3. A machine for binding ears of corn in superposed spaced relation for drying comprising a frame, pairs of crossed levers pivotally connected together and to the frame, eyes formed on the lower ends of each lever of the pairs of levers, a twine feeding mechanism, means for operating the levers, and means for operating the twine feeding mechanism in a step-by-step movement.

4. A machine for binding seed corn together for drying comprising a frame having a vertically disposed guide way therein, pairs of cross levers pivotally connected together and to the frame, arranged in the upper end of said vertically disposed guide way, binding twine feeding mechanism carried by the frame, guides carried by the frame for receiving the binding twine from the feeding mechanism, the lower ends of the pairs of levers being provided with eyes for receiving the binding twine from the guiding means, a drive shaft, and means operatively connecting the drive shaft with the pairs of levers and with the twine feeding mechanism for permitting the synchronous operation thereof upon actuation of said drive shaft.

5. A machine for binding seed corn together for drying comprising a frame having a vertically disposed guide way therein, pairs of crossed levers pivotally connected together and to the frame and disposed in said guide ways, a transversely extending shaft, pairs of levers carried by the shaft, means pivotally connecting the opposite ends of the last mentioned levers to the upper ends of the pairs of crossed levers, a guide shaft, a crank pin carried by the guide shaft, a connecting rod operatively connecting the crank pin and the upper end of one of the cross levers together, and means for feeding binding twine to the lower ends of the pairs of cross levers.

6. A machine for binding seed corn together for drying comprising a frame having a vertically disposed guide way therein, pairs of crossed levers pivotally connected together in the guide way, means synchronously operating the levers, a binding corn feeding mechanism for the levers comprising a pair of superposed intermeshing gear wheels between which the binding cords are adapted to be fed, spring means for normally holding the gear wheels in engagement with each other, and means for operating said gear wheels with the lever operating means.

HARRY J. HEADRICK.
SAMUEL A. PALMER.